April 26, 1938. L. C. GURLEY 2,115,629
TRAILER HITCH
Filed May 24, 1937
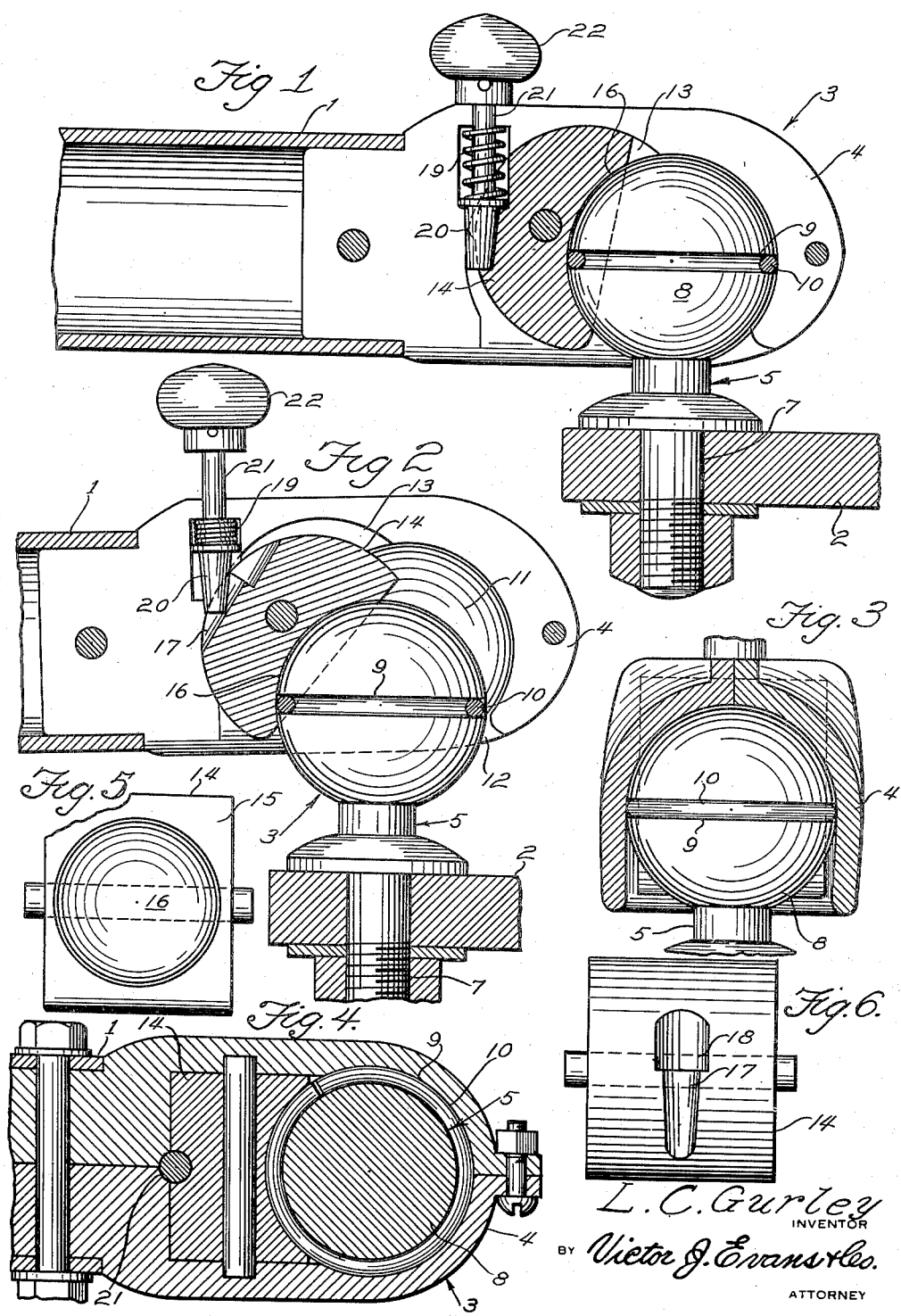
L. C. Gurley
INVENTOR
BY Victor J. Evans & Co.
ATTORNEY Patented Apr. 26, 1938

2,115,629

UNITED STATES PATENT OFFICE 2,115,629

TRAILER HITCH

Lyle C. Gurley, Denver, Colo.

Application May 24, 1937, Serial No. 144,521

1 Claim. (Cl. 280—33.15)

This invention relates to trailer hitches and has for the primary object the provision of an efficient and inexpensive device of this character which will provide a quick detachable coupling between a trailer and an automobile and one which will permit free pivotal movement and will be self-locking when the detachable elements thereof are brought together.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view illustrating a trailer hitch constructed in accordance with my invention.

Figure 2 is a view similar to Figure 1 showing the actuation of the hitch to release the separable elements thereof.

Figure 3 is a transverse sectional view showing the ball element of the hitch fitting in the socket element and equipped with an anti-rattle device.

Figure 4 is a fragmentary longitudinal sectional view illustrating the hitch.

Figure 5 is a front view illustrating a locking element.

Figure 6 is a rear view illustrating the locking element.

Referring in detail to the drawing, the numeral 1 indicates a draft tongue to be connected in any well known manner to a trailer, 2 an attaching bracket secured in any well known manner to an automobile. A coupler is employed for detachably connecting the draft tongue onto the bracket 2 and which will permit free pivotal movement of the draft tongue relative to the bracket. The coupler is indicated generally by the character 3 and consists of a female element 4 secured in the tongue 1 and a male element 5 consisting of a shank 7 and a ball 8. The shank 7 is detachably secured on the bracket 2. A groove 9 is formed in the ball 8 to receive a split ring 10. The ring 10 when engaged with the female element of the coupler is to prevent rattling of the ball in the female element.

The female element has a spherical shaped socket 11 which opens outwardly through the lower face of the female element in the form of a mouth 12 through which the ball 8 may pass freely to contact the walls of the socket 11. The female element also has formed therein an eccentric chamber 13 which communicates with the socket 11 and journaled in the chamber 13 is a locking element or an eccentric 14 of semi-cylindrical shape presenting a flat face 15 and formed in said face is a semi-spherical shaped recess 16. The locking element or eccentric 15 has formed therein a tapered groove 17 opposite the recess 16. A shoulder 18 is formed in the groove 17. A plunger chamber 19 is formed in the female element and communicates with the eccentric chamber 13 and also opens outwardly through the top wall of the female element. A spring pressed plunger 20 is mounted in the plunger chamber 19 and the stem 21 thereof projects above the top wall of the female element and has secured thereto a finger piece 22. The plunger 20 is adapted to enter the groove 17 of the eccentric for locking the same against pivotal movement and in a position to restrict the size of the mouth 12 of the socket 11 with a portion of the ball lying within the recess 16. The ball is then locked in the socket 11 and the female element is free to pivot on said ball or to have a universal movement relative thereto. To release the ball from the socket 11 the plunger 20 is pulled out of the groove 17 permitting the eccentric or locking element 14 to pivot as the female element is lifted off of the ball or male element 5. The eccentric or pivotal element 14 when freed for pivotal movement and the female element lifted upwardly with respect to the ball will cause the eccentric to move out of the mouth 12 and thereby permit the ball to pass freely through the mouth.

What is claimed is:

A trailer hitch comprising male and female elements and said male element including a ball, said female element having a substantially spherical shaped socket opening outwardly through a wall thereof to provide a mouth for permitting the ball to enter the socket, an eccentric locking element pivotally mounted in the female element for restricting the size of the mouth and having a recess to receive a portion of the ball, said eccentric element having a groove, said female element having a plunger chamber, a spring pressed plunger operating in said chamber to enter the groove for securing the eccentric locking member against pivotal movement, said ball having a groove, and a split ring mounted in said groove to contact the walls of the socket of the female element and said eccentric locking element.

LYLE C. GURLEY.